(12) United States Patent
Giessler-Blank et al.

(10) Patent No.: US 7,666,257 B2
(45) Date of Patent: Feb. 23, 2010

(54) STORAGE-STABLE COATING COMPOSITION FOR ABRASION-RESISTANTLY AND WEATHERING-STABLY PROVIDING SMOOTH INORGANIC SURFACES WITH EASY-TO-CLEAN PROPERTIES

(75) Inventors: Sabine Giessler-Blank, Dortmund (DE); Eckhard Just, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 114 days.

(21) Appl. No.: 12/090,327

(22) PCT Filed: Nov. 15, 2006

(86) PCT No.: PCT/EP2006/068491

§ 371 (c)(1),
(2), (4) Date: Apr. 15, 2008

(87) PCT Pub. No.: WO2007/068545

PCT Pub. Date: Jun. 21, 2007

(65) Prior Publication Data

US 2008/0210130 A1    Sep. 4, 2008

(30) Foreign Application Priority Data

Dec. 15, 2005    (DE) ........................ 10 2005 060 401

(51) Int. Cl.
C09D 4/00 (2006.01)
(52) U.S. Cl. ................................. 106/287.14
(58) Field of Classification Search ............ 106/287.14, 106/287.013
See application file for complete search history.

(56) References Cited

U.S. PATENT DOCUMENTS

| | | | |
|---|---|---|---|
| 5,997,943 A * | 12/1999 | Azzopardi et al. | 427/167 |
| 6,177,582 B1 | 1/2001 | Jenkner et al. | |
| 6,251,989 B1 | 6/2001 | Edelmann et al. | |
| 6,361,871 B1 | 3/2002 | Jenkner et al. | |
| 6,426,150 B1 | 7/2002 | Jenkner et al. | |
| 6,713,186 B1 | 3/2004 | Jenkner et al. | |
| 7,578,877 B2 * | 8/2009 | Giessler et al. | 106/287.13 |
| 2002/0192385 A1 | 12/2002 | Jenkner et al. | |
| 2006/0185555 A1 | 8/2006 | Giessler et al. | |
| 2006/0204767 A1 | 9/2006 | Albert et al. | |
| 2007/0054056 A1 | 3/2007 | Albert et al. | |

FOREIGN PATENT DOCUMENTS

| | | |
|---|---|---|
| DE | 199 41 752 | 4/2001 |
| DE | 103 36 544 | 2/2005 |
| WO | 99 19084 | 4/1999 |

OTHER PUBLICATIONS

U.S. Appl. No. 11/572,555, filed Jan. 23, 2007, Just, et al.
U.S. Appl. No. 12/096,647, filed Jun. 9, 2008, Giessler, et al.

* cited by examiner

Primary Examiner—David M Brunsman
(74) Attorney, Agent, or Firm—Oblon, Spivak, McClelland, Maier & Neustadt, L.L.P.

(57) ABSTRACT

The present invention relates to a special coating composition based on components a) at least one hydrolysable fluoro-alkylsilane of the formula (I) $CF_3(CF_2)_n(CH_2)_2Si(CH_3)_yX_{3-y}$, in which X is a group from the series chlorine, methoxy, ethoxy, isopropoxy, and n-propoxy and n is a number from the series 3, 4, 5, 6, 7, 8, and 9, and y is 0 or 1, b) HCl, c) water, d) isopropanol, and e) at least one further solvent and/or diluent from the series of the alcohols, glycols, glycol ethers, ethers, esters, ketones, and aliphatic and aromatic hydrocarbons, wherein the silane component (a):water molar ratio of 1:4.5 to 1:9. The invention further relates to a process for preparing such a composition and also to its use for providing smooth, inorganic substrate surfaces with an abrasion-resistant and weathering-stable easy-to-clean coating.

13 Claims, No Drawings

STORAGE-STABLE COATING COMPOSITION FOR ABRASION-RESISTANTLY AND WEATHERING-STABLY PROVIDING SMOOTH INORGANIC SURFACES WITH EASY-TO-CLEAN PROPERTIES

This application is a 371 filing of PCT/EP2006/068491, filed Nov. 15, 2006.

The present invention relates to a new coating composition for providing surfaces with an oil-, water-, and dirt-repellant coating. The invention further relates to a process for preparing the new composition and also to its use.

Surfaces with oil, water, and dirt repellency properties are referred to in the everyday art as "easy to clean".

Easy-to-clean coatings based on alkylsilanes and/or fluoroalkylsilanes are well known (from GB 935 380, U.S. Pat. No. 3,012,006, U.S. Pat. No. 3,354,022, JP 2001/115151, DE 834 002, DE 15 18 551, DE 38 36 815, DE 42 18 657, DE 195 44 763, EP 0 492 417, EP 0 513 727, EP 0 548 775, EP 0 657 393, EP 0 672 779, EP 0 799 873, EP 0 846 716, EP 1 033 395, EP 1 101 787, WO 95/23830, WO 00/063312, and WO 05/014731, among many others).

Of the existing coating systems, those based on fluoroorgano-functional silanes and/or siloxanes are the most suitable in terms of their easy-clean properties. Systems described for producing an easy-to-clean coating include corresponding 100% systems, solvent-containing systems, emulsions, and aqueous systems.

Coatings systems from EP 0 825 157 A2, EP 0 947 478 A1 and WO 99/014284 contain hydrolysates or condensates based on hydrolysable, fluoroalkyl-functional organosilanes, and emphasize the use of nitric acid as a catalyst along with a purposively guided hydrolysis and condensation. Other acids are said to be less suitable as catalysts. Compositions of this kind may additionally comprise organic solvents, such as lower alcohols, ethers, and ketones.

The products already on the market have only a comparatively short storage stability or low abrasion resistance in coatings obtained using them. Furthermore, many systems lose their activity after only a short time, particularly in terms of the oleophobic effect. Moreover, there is increased demand for better weathering stability.

It was an object of the present invention to provide a further coating system, marrying maximum storage stability with effectiveness, for easy-clean applications. A particular concern on the part of the invention was to provide a system suitable for an abrasion-resistant and weathering-stable easy-to-clean coating on smooth, substantially inorganic surfaces.

The stated object is solved in accordance with the invention as specified in the claims.

Thus it has been found, surprisingly, that a storage-stable, easy-to-clean coating composition based on components
a) at least one hydrolyzable fluoroalkylsilane of the formula (I)

in which X is a group from the series chlorine, methoxy, ethoxy, isopropoxy, and n-propoxy and n is a number from the series 3, 4, 5, 6, 7, 8, and 9, and y is 0 or 1,
b) HCl,
c) water,
d) isopropanol, and
e) at least one further solvent and/or diluent from the series of the alcohols, glycols, glycol ethers, ethers, esters, ketones, and aliphatic and aromatic hydrocarbons, and on a silane component (a):water molar ratio of 1:4.5 to 1:9 can be advantageously applied, simply and economically, effectively and durably, particularly to a smooth, substantially—but not exclusively—inorganic substrate surface and in outdoor applications in particular.

Hence the compositions of the invention are notable for an outstanding storage stability of at least one year. In addition it is surprising that the systems of the invention, which contain HCl as catalyst, are in fact notable, following application, for outstanding easy-clean properties, excellent abrasion resistance, and, at the same time, high weathering stability and chemical resistance.

The present invention accordingly provides a coating composition based on components
a) at least one hydrolyzable fluoroalkylsilane of the formula (I)

in which X is a group from the series chlorine, methoxy, ethoxy, isopropoxy, and n-propoxy and n is a number from the series 3, 4, 5, 6, 7, 8, and 9, and y is 0 or 1,
b) HCl,
c) water,
d) isopropanol, and
e) at least one solvent and/or diluent from the series of the alcohols, glycols, glycol ethers, ethers, esters, ketones, and aliphatic and aromatic hydrocarbons, with the exception of dodecanes, and on a silane component (a):water molar ratio of 1:4.5 to 1:9, preferably 1:4.8 to 1:7, more preferably 1:5 to 1:6.

A composition of the invention preferably comprises
a) 20 parts by weight of component (a),
b) 0.05 to 0.15 part by weight of HCl, preferably 0.07 to 0.12 part by weight, more preferably 0.074 to 0.11 part by weight of HCl,
c) 3.2 to 6.4 parts by weight of $H_2O$, preferably 3.6 to 6 parts by weight, more preferably 3.7 to 4.2 parts by weight, in particular 3.8 to 4.0 parts by weight of $H_2O$,
d) 500 to 1000 parts by weight of isopropanol, preferably 600 to 900 parts by weight of isopropanol, and
e) 30 to 60 parts by weight of component (e), preferably 40 to 50 parts by weight of component (e).

Preference is given in particular to a silane component (a):water molar ratio of 1:5.3 to 1:5.8.

A coating composition of the invention of this kind is advantageously obtainable by diluting the silane component (a) with isopropanol and subjecting it in the presence of HCl to partial, i.e., controlled, hydrolysis and also to condensation, the silane component (a):water molar ratio being 1:4.5 to 1:9, and subsequently diluting the reaction mixture thus obtained with a mixture of components (d) and (e).

The present invention also provides in particular a process for preparing a composition of the invention, by diluting the silane component (a) with isopropanol, then adding water and then hydrochloric acid, stirring the mixture thus obtained for 1 to 4 hours, preferably for 2 to 3 hours, at a temperature of 0 to 80° C., preferably of room temperature to 40° C. and the hydrolysis step being based on a silane component (a):water molar ratio of 1:4.5 to 1:9 (partial hydrolysis and condensation called hydrolysis step for short), and subsequently diluting the reaction mixture thus obtained (and called hydrolysate for short) with a mixture of components (d) and (e) or adding silane component (a) to a mixture of isopropanol, water, and hydrochloric acid, stirring the mixture thus obtained for 1 to 4 hours, preferably 2 to 3 hours, at a temperature of 0 to 80° C., preferably of room temperature to 40°

C., the hydrolysis step being based on a silane component (a):water molar ratio of 1:4.5 to 1:9 (partial hydrolysis and condensation called hydrolysis step for short) and subsequently diluting the reaction mixture thus obtained (and called hydrolysate for short) with a mixture of components (d), (e), and hydrochloric acid.

In the process of the invention the components are employed preferably in an amount of
a) 20 parts by weight of fluoroalkylsilane of formula (I),
b) 0.05 to 0.15 part by weight of HCl,
c) 3.2 to 6.4 parts by weight of $H_2O$,
d) 500 to 1000 parts by weight of isopropanol, and
e) 30 to 60 parts by weight of component (e).

Particular preference is given to employing 1 to 1.5 parts by weight of component (d) per part by weight of component (a) in the hydrolysis step.

Additionally it is preferred in the process of the invention to employ 40% to 100% by weight of component (b) in the hydrolysis step.

Furthermore, preference is given in the process of the invention to diluting the inventively obtained hydrolysate with a mixture of component (e) and the remainder of component (d) or with a mixture of component (e), the remainder of component (d), and the remainder of component (b).

Thus in the process of the invention as component (a) it is possible for example—but not exclusively—to use $CF_3$—$(CF_2)_5$—$(CH_2)_2$—$Si(OCH_3)_3$, $CF_3$—$(CF_2)_5$—$(CH_2)_2$—$Si(OC_2H_5)_3$, $CF_3$—$(CF_2)_5$—$(CH_2)_2$—$SiCl_3$, $CF_3$—$(CF_2)_5$—$(CH_2)_2$—$Si(CH_3)Cl_2$, $CF_3$—$(CF_2)_7$—$(CH_2)_2$—$SiCl_3$, $CF_3$—$(CF_2)_7$—$(CH_2)_2$—$Si(OCH_3)_3$, $CF_3$—$(CF_2)_7$—$(CH_2)_2$—$Si(OC_2H_5)_3$, $C_{10}F_{21}$—$(CH_2)_2$—$Si(OCH_3)_3$, $C_{10}F_{21}$—$(CH_2)_2$—$Si(OC_2H_5)_3$, $C_{10}F_{21}$—$(CH_2)_2$—$SiCl_3$ or a mixture of at least two of the hydrolyzable fluoroalkylsilanes of formula (I).

As component (b) it is preferred to use an aqueous HCl solution, in particular a 37% strength hydrochloric acid solution. Alternatively the HCl component can be generated under hydrolysis conditions by the corresponding proportional use of a chlorosilane—cf. formula (I) in particular. A further alternative is to supply the HCl to the system in gas form, by introducing it correspondingly into the mixture of components a), c), and d) for example.

Water as component (c) may already be present—at least proportionally—in component (b) or else can be used separately or additionally in the form of fully deionized water or distilled water.

Component (d), i.e., isopropanol, can be used in commercially customary form.

As component (e) it is preferred in accordance with the invention to use a compound or a mixture of at least two compounds from the series methanol, ethanol, n-butanol, sec-butanol, tert-butanol (TBA), ethylene glycol, ethyl glycol ether, propyl glycol ether, butyl glycol ether, diethylene glycol, ethyl glycol, propyl glycol, butyl glycol, 1-methoxypropan-2-ol, 2-methoxyethanol, methyl tert-butyl ether (MTBE), ethyl tert-butyl ether (ETBE), methyl ethyl ketone, acetone, butanone, halogenated—especially chlorinated—hydrocarbons, octane, nonane, decane, undecane, petroleum, and white spirit.

In general the inventive process is carried out as follows:

In general the silane component of formula (I) is normally subjected to controlled hydrolysis and condensation in the presence of defined amounts of HCl and isopropanol, the silane component (a):water molar ratio being set at 1:4.5 to 1:9. Usually the reaction is carried out advantageously with effective mixing and at a temperature in the range from 0 to 80° C., in particular at room temperature, for a time of 1 to 4 hours. The hydrolysate thus obtained is subsequently diluted with a mixture of isopropanol and component (e), advantageously giving a storage-stable and effective coating composition. For the controlled dilution of the reaction mixture or hydrolysate, however, it is also possible to use a mixture of a corresponding amount of isopropanol, component (e), and HCl. Alternatively the aforementioned substances can each be used as individual components.

Advantageously in this way a coating composition of the invention is obtained which has a storage stability of at least 1 year and which, when applied to a smooth, substantially inorganic substrate surface, produces a particularly abrasion-resistant and weathering-stable, easy-to-clean coating.

Coatings of the invention are likewise notable for hydrophobic and oleophobic properties which also retain their effects over a prolonged period of time.

The coating system of the invention can in particular be employed advantageously on glass or glazes, such as on windscreens, glass shower cabins, wall tiles, and sanitary ceramics.

The way in which a coating composition of the invention is applied to a smooth, substantially inorganic substrate surface is appropriately as follows:

the substrate surface is appropriately first cleaned, particularly to remove dust and grease, and if desired is activated. This can be done using, for example, isopropanol, acetone or a commercial glass cleaner. Activation can then take place using, for example, an abrasive, aqueous agent that preferably contains oxidic particles having an average particle diameter ($d_{50}$) of less than 6 μm, preferably 0.05 to 5 μm. Abrasive media of this kind may be in the form of a suspension, dispersion or paste. Corresponding aqueous and/or alcoholic metal slurries contain preferably cerium oxide, aluminum oxide, aluminum hydroxide, magnesium oxide, iron oxide, titanium oxide, aluminum silicate, silicon oxides, or a mixture of aforementioned oxides. Such a composition may advantageously have an alkaline or acidic formulation.

The coating composition of the invention can be applied advantageously by dipping, spraying, squirting, wiping, polishing or buffing to the prepared substrate surface, preferably at a temperature of 5 to 30° C., in particular at 10 to 25° C., and a relative humidity of 30% to 80%, in particular at around 50% to 60% relative humidity, and allowed to harden and react.

In general a coating composition applied in this way displays its advantageous effect after just a few minutes. Following the coating step it is possible if desired to carry out thermal aftertreatment at a temperature of 40 to 250° C. for approximately 10 minutes. In general, however, this coating is simply left to dry under ambient conditions. It is particularly advantageous if the coating is allowed to harden at a temperature of approximately 25° C. for approximately 1 day, during which no water is applied to the freshly coated area.

The present invention hence additionally provides for the use of a composition of the invention for equipping smooth, substantially inorganic substrate surfaces with an abrasion-resistant and weathering-stable, easy-to-clean coating, especially metal, glass, ceramic or glazed surfaces, such as windscreens, shower cabins, windows, doors, wall tiles, and other sanitary ceramics or sanitary fittings, to name but a few examples, and additionally substrate surfaces based on polycarbonate, polymethyl methacrylate (PMMA), polyurethane (PU), and polystyrene.

What is claimed is:

1. A coating composition based on components
a) at least one hydrolyzable fluoroalkylsilane of the general formula (I)

$$CF_3(CF_2)_n(CH_2)_2Si(CH_3)_yX_{3-y} \quad (I),$$

in which X is a group from the series chlorine, methoxy, ethoxy, isopropoxy, and n-propoxy and n is a number from the series 3, 4, 5, 6, 7, 8, and 9, and y is 0 or 1,
b) HCl,
c) water,
d) isopropanol, and
e) at least one solvent and/or diluent from the series of the alcohols, glycols, glycol ethers, ethers, esters, ketones, and aliphatic and aromatic hydrocarbons, with the exception of dodecanes,
and on a silane component (a):water molar ratio of 1:4.5 to 1:9.

2. A composition as claimed in claim 1, comprising
a) 20 parts by weight of component (a),
b) 0.05 to 0.15 part by weight of HCl,
c) 3.2 to 6.4 parts by weight of $H_2O$,
d) 500 to 1000 parts by weight of isopropanol, and
e) 30 to 60 parts by weight of component (e).

3. A composition as claimed in claim 1, wherein the silane component (a):water molar ratio is 1:5.3 to 1:5.8.

4. A coating composition as claimed in claim 1, obtainable by diluting the silane component (a) with isopropanol and subjecting it in the presence of HCl to partial hydrolysis and also to condensation, the silane component (a):water molar ratio being 1:4.5 to 1:9, and subsequently diluting the reaction mixture thus obtained with a mixture of components (d) and (e).

5. The method of using a coating composition as claimed in claim 4 for providing smooth, substantially inorganic substrate surfaces with abrasion-resistant and weathering-stable easy-to-clean coating.

6. A process for preparing a coating composition as claimed in claim 1,
which comprises
diluting the silane component (a) with isopropanol, then adding water and then hydrochloric acid, stirring the mixture thus obtained for 1 to 4 hours at a temperature of 0 to 80° C., the hydrolysis step being based on a silane component (a):water molar ratio of 1:4.5 to 1:9, and subsequently diluting the reaction mixture with a mixture of components (d) and (e)
or
comprises adding silane component (a) to a mixture of isopropanol, water and hydrochloric acid, stirring the mixture thus obtained for 1 to 4 hours at a temperature of 0 to 80° C., the hydrolysis step being based on a silane component (a):water molar ratio of 1:4.5 to 1:9, and subsequently diluting the reaction mixture with a mixture of components (d), (e), and hydrochloric acid.

7. A process as claimed in claim 6,
wherein the components are employed in an amount of
a) 20 parts by weight of fluoroalkylsilane of formula (I),
b) 0.05 to 0.15 part by weight of HCl,
c) 3.2 to 6.4 parts by weight of $H_2O$,
d) 500 to 1000 parts by weight of isopropanol, and
e) 30 to 60 parts by weight of component (e).

8. A process as claimed in claim 6,
wherein 1 to 1.5 parts by weight of component (d) are used per part by weight of component (a) in the hydrolysis step.

9. A process as claimed in claim 6,
wherein 40% to 100% by weight of component (b) is used in the hydrolysis step.

10. A process as claimed in claim 6,
wherein component (e) is selected from the series methanol, ethanol, n-butanol, sec-butanol, tert-butanol, ethylene glycol, ethyl glycol ether, propyl glycol ether, butyl glycol ether, diethylene glycol, propylene glycol, 1-methoxypropan-2-ol, 2-methoxyethanol, acetone, methyl ethyl ketone, butanone, chlorinated hydrocarbons, methyl tert-butyl ether, ethyl tert-butyl ether, octane, nonane, decane, undecane, petroleum, white spirit or a mixture of at least two of the aforementioned substances.

11. A process as claimed in claim 6,
wherein the hydrolysate is diluted with a mixture of component (e) and the remainder of component (d) or with a mixture of component (e), the remainder of component (d), and the remainder of component (b).

12. The method of using a composition as claimed in claim 1 for providing smooth, substantially inorganic substrate surfaces with an abrasion-resistant and weathering-stable easy-to-clean coating.

13. The method as claimed in claim 12, the substrate of the surface to be treated being selected from the series glass, glazes, minerals, metal, ceramic, polycarbonate, polymethyl methacrylate, polyurethane, and polystyrene.

* * * * *